No. 43,131.  
J. G. PERRY.  
SAUSAGE FILLER.  
PATENTED JUNE 14, 1864.

Witnesses;
O. H. Perry

Inventor;
John G. Perry

UNITED STATES PATENT OFFICE.

JOHN G. PERRY, OF SOUTH KINGSTON, RHODE ISLAND.

IMPROVED SAUSAGE-FILLER.

Specification forming part of Letters Patent No. 43,131, dated June 14, 1864.

*To all whom it may concern:*

Be it known that I, JOHN G. PERRY, of South Kingston, in the county of Washington, in the State of Rhode Island, have invented a new and useful Improvement in Machines for Filling Sausages; and I do hereby declare that the following is a full and correct description thereof, reference being had to the accompanying drawings, forming part of this specification, and to the letters of reference marked thereon.

Figure 1:
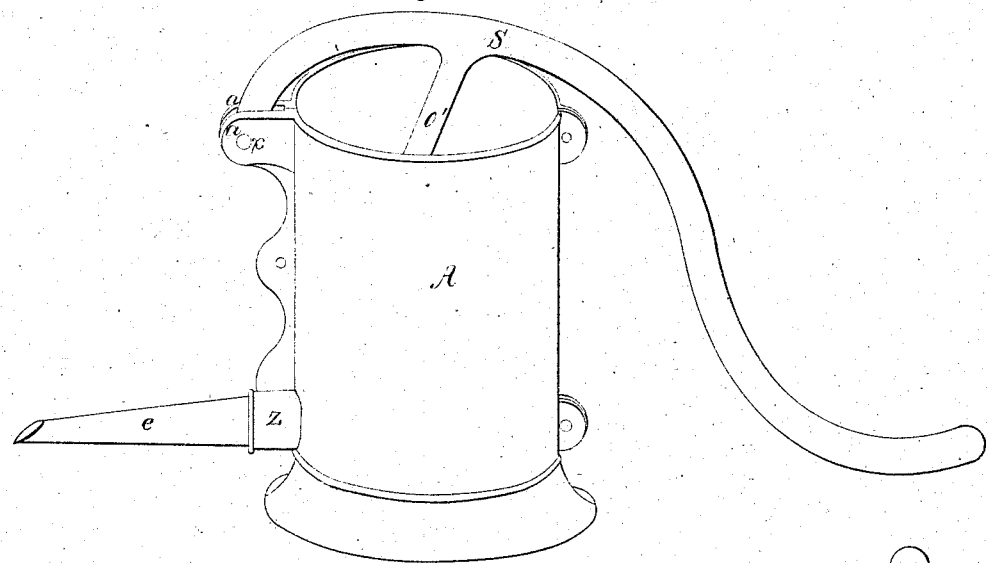
Figure 2:
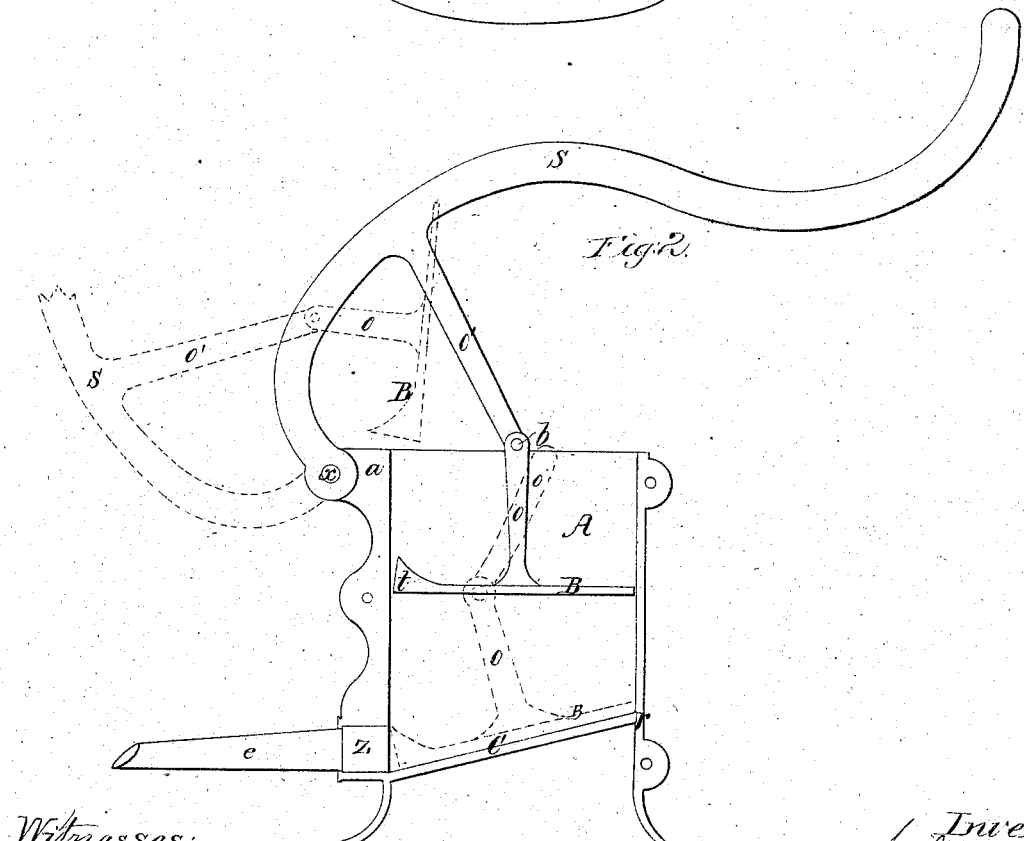

In these drawings, Figure 1 is a perspective view of the machine. Fig. 2 is a vertical cross-section.

That others may understand and be enabled to construct my improved sausage-filler I will describe it.

A is an upright cylinder, (it may be made of other shapes than round if desired,) having two ears, $a\,a$, on one side of the top, between which is hung the lever S, which moves on a pin, $x$, running through them. The bottom C of the cylinder is placed at $r$ in an inclined position slanting down from the back of the cylinder toward the bottom of the discharging-aperture $z$. This is for the purpose of facilitating the discharge of the meat and to insure, in connection with a peculiar arrangment of the piston and its rod, the complete discharge of all the meat in the cylinder. The piston head B has a part, $o$, of the rod that moves it secured to it firmly, while the other part $o'$ of the rod is fastened to the lever $s$ in like manner, the two parts being connected together by a joint at $b$. The part of the rod on the lever S is made a little longer than that attached to the piston head B. The advantage of this arrangement consists in securing the piston-head in proper position through all its motion.

The black dotted lines in Fig. 2 show how the piston-head is tipped over out of the way when the lever S is raised, so as to allow the cylinder to be filled with the meat conveniently, and when the head is half-way down it stands square across the cylinder; but as it approaches the bottom it closes the back part of the cavity in the cylinder first and forces the meat to move toward the aperture $z$. This lessens the labor of forcing the meat out into the cases very much, as it is of such consistency, when prepared for filling, that it cannot be readily moved about like a fluid.

The mode of operation is as follows: The cases to be filled being placed upon the nozzle $e$ and the lever $s$ raised, as seen in the black dotted lines, Fig. 2, the cylinder A is to be filled with the prepared meat, when, by bringing down the lever, the meat is forced out through the nozzle into the cases upon it.

Having thus described my improved filler, what I claim, and desire to secure by Letters Patent, is—

The combination of the nozzle and cylinder with the piston head and rod, all being constructed and arranged substantially as herein described, and for the purpose set forth.

JOHN G. PERRY.

Witnesses:
WM. D. ARNOLD,
BENJAMIN ARNOLD.